(12) United States Patent
Olsson et al.

(10) Patent No.: US 9,204,343 B2
(45) Date of Patent: Dec. 1, 2015

(54) METHOD OF CONTEXT HANDLING WHEN A USER EQUIPMENT MOVES BETWEEN ACCESS NETWORKS

(75) Inventors: Lasse Olsson, Stenungsund (SE); Peter Ramle, Molnlycke (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 138 days.

(21) Appl. No.: 13/578,730

(22) PCT Filed: Feb. 15, 2010

(86) PCT No.: PCT/EP2010/051848
§ 371 (c)(1),
(2), (4) Date: Aug. 13, 2012

(87) PCT Pub. No.: WO2011/098146
PCT Pub. Date: Aug. 18, 2011

(65) Prior Publication Data
US 2012/0307801 A1 Dec. 6, 2012

(51) Int. Cl.
*H04W 36/00* (2009.01)
(52) U.S. Cl.
CPC ...... *H04W 36/0033* (2013.01); *H04W 36/0022* (2013.01)
(58) Field of Classification Search
CPC .................. H04W 36/0033; H04W 36/0022
USPC ............ 370/310, 310.2, 328, 331, 338; 455/432.1, 436, 437–439
See application file for complete search history.

(56) References Cited

U.S. PATENT DOCUMENTS 6,661,782 B1 * 12/2003 Mustajarvi et al. ........... 370/331
6,955,918 B2 * 10/2005 Haumont et al. ............. 455/436
(Continued)

OTHER PUBLICATIONS

ETSI, LTE; General Packet Radio Services (GPRS) enhancements for Evolved Universal Terrestrial Radio Access Network (E-UTRAN) access (3GPP TS 23.401 version 8.4.1 Release 8), Jan. 2009, pp. 171, 186-191.*

(Continued)

*Primary Examiner* — Kwang B Yao
*Assistant Examiner* — Ricardo Castaneyra
(74) *Attorney, Agent, or Firm* — Rothwell, Figg, Ernst & Manbeck, P.C.

(57) ABSTRACT

The present invention relates to a method for context handling when a user equipment (10), UE, with established bearers towards a Gateway GPRS Support Node (11), GGSN, and a Packet Data Network GGSN (12), PGW-GGSN, moves from a previous Access Network, AN, to a present AN. The previous AN communicates with the GGSN (11) and the PGW-GGSN (12) via a previous Mobility Control Node (13), MCN. The present AN communicates with the PGW-GGSN (12) via a present MCN (14). The method comprises a step where the UE (10) detects (15) that it has entered a Mobility Area, MA, belonging to the present AN and requests for a Mobility Area Update, MAU, at the present MCN (14). The method is particularly characterized in the steps of: —The present MCN (14) derives (16) the previous MCN (13) from the MAU request and initiates a handshake procedure including exchange of capabilities with the previous MCN (13). —The present MCN (14) sends a context acknowledge message to the previous MCN (13) when it has accepted the MAU request and updated the established bearers towards the PGW-GGSN (12). —The previous MCN (13) removes at least one Packet Data Protocol, PDP, context existing in the GGSN (11) as a result of the context acknowledge message.

16 Claims, 4 Drawing Sheets

(56) References Cited

U.S. PATENT DOCUMENTS

| | | | |
|---|---|---|---|
| 2007/0253359 A1* | 11/2007 | Hall et al. | 370/328 |
| 2008/0095119 A1* | 4/2008 | Bachmann et al. | 370/332 |
| 2009/0275309 A1* | 11/2009 | He | 455/410 |
| 2010/0118790 A1* | 5/2010 | Guo et al. | 370/328 |

OTHER PUBLICATIONS

ETSI, Digital cellular telecommunications system (Phase +2); Universal Mobile Telecommunications System (UMTS); General Packet Radio Service (GPRS); GPRS Tunnelling Protocol (GTP) across the Gn and Gp interface (3GPP TS 29.060 version 7.6.0 Release 7), Jun. 2007, pp. 11, 21-35.*

ETSI, "LTE; General Packet Radio Service (GPRS) enhancements for Evolved Universal Terrestrial Radio Access Network (E-UTRAN) access (3GPP TS23.401 Version 9.3.0 Release 9)", ETSI TS 123 401 V9.3.0, Jan. 1, 2010, 256 pages; XP014045280.

* cited by examiner

US 9,204,343 B2

METHOD OF CONTEXT HANDLING WHEN A USER EQUIPMENT MOVES BETWEEN ACCESS NETWORKS

CROSS-REFERENCE TO RELATED APPLICATION

This application is a 35 U.S.C. §371 National Phase Entry Application from PCT/EP2010/051848, filed Feb. 15, 2010, and designating the United States, this disclosure of which is incorporated herein by reference.

TECHNICAL FIELD

The present invention relates to a method for context handling when a User Equipment, with established bearers towards a GGSN (Gateway GGSN Support Node) and a PGW (Packet Data Network Gateway), moves from a previous access network to a present access network. The previous access network communicates with the gateways via a previous mobility control node and the present access network communicates with the PGW via a present mobility control node. It also relates to a previous mobility control node and a present control node adapted for the same purpose.

BACKGROUND

Terminals (User Equipments/Mobile Stations) are often equipped with capabilities for access via 2G/3G and LTE (Long Term Evolution). Other equipments, such as a laptop, may have capabilities for access via HSPA (High Speed Packet Access)/LTE (Long Term Evolution), WLAN (Wireless LAN) and Ethernet. Typically the terminal or laptop uses different accesses one at a time. And more important, a given service or a given IP session is only using one access at a time.

In a Gn-SGSN (Serving Gateway Support Node), which is an SGSN not supporting S4 interface but only Gn/Gp interface, it is possible for the mobile station/user equipment (MS/UE) to activate PDP (Packet Data Protocol) contexts towards a GGSN and towards a PGW simultaneously. The PGW has Gn/Gp interface and thus acts as a GGSN over that interface. The 3GPP standard allows for this simultaneously existence of PDP contexts towards GGSN and PGW in a Gn-SGSN. However, this is prevented in a S4-SGSN.

In EPC (Evolved Packet Core) the MME (Mobility Management Entity) has no interface towards the GGSNs. Since the MME has no interface towards the GGSN, there is a problem when the MS/UE moves to EPC. The PDP contexts in the GGSN can't be handled by MME and there exist no possible way to remove them. The only option to solve this is to reject the whole TAU procedure when moving to EPC if the MS/UE simultaneously has activated PDPs towards GGSN and PGW.

SUMMARY OF THE INVENTION

The object of the present invention is therefore to provide a procedure for removing PDP contexts in the GGSN when a UE moves from a Gn-SGSN to an MME.

The problem is solved by means of a method for context handling when a user equipment, UE, with established bearers towards a Gateway GPRS Support Node, GGSN, and a Packet Data Network GGSN, PGW, moves from a previous Access Network, AN, to a present AN. The previous AN communicates with the GGSN and the PGW via a previous Mobility Control Node, MCN. The present AN communicates with the PGW via a present MCN. The method comprises the step where UE detects that it has entered a Mobility Area, MA, belonging to the present AN and requests for a Mobility Area Update, MAU, at the present MCN (14). The method is particularly characterized in the steps of:

The present MCN derives the previous MCN from the MAU request and initiates a handshake procedure including exchange of capabilities with the previous MCN.

The present MCN sends a context acknowledge message to the previous MCN when it has accepted the MAU request and updated the established bearers towards the PGW.

The previous MCN removes at least one Packet Data Protocol, PDP, context existing in the GGSN as a result of the context acknowledge message.

The problem is also solved by means of a method for context handling when a user equipment, UE, with established bearers towards a Gateway GPRS Support Node, GGSN, and a Packet Data Network GGSN, PGW, moves from a previous Access Network, AN, to a present AN. The previous AN communicates with the GGSN and the PGW via a previous Mobility Control Node, MCN. The present AN communicates with the PGW via a present MCN. The method comprises the step where UE detects that it has entered a Mobility Area, MA, belonging to the present AN and requests for a Mobility Area Update, MAU, at the present MCN (14). The method is particularly characterized in the steps of:

The present MCN derives the previous MCN from the MAU request and initiates a handshake procedure including exchange of capabilities with the previous MCN.

The present MCN sends a context acknowledge message to the previous MCN when it has accepted the MAU request and updated the established bearers towards the PGW.

The problem is also solved by means of a method for context handling wherein a previous Mobility Control Code, MCN, removes at least one Packet Data Protocol, PDP, context existing in the GGSN as a result of the context acknowledge message received from said present MCN.

The problem is also solved by means of a present Mobility Control Node, MCN, being adapted for context handling when a user equipment, UE, with established bearers towards a Gateway GPRS Support Node, GGSN, and a Packet Data Network GGSN, PGW, moves from a previous Access Network, AN, to a present AN. The previous AN communicates with the GGSN and the PGW via a previous Mobility Control Node, MCN. The present AN communicates with the PGW via a present MCN. The present MCN in particularly characterized in that it is adapted to:

derive the previous MCN from a Mobility Area Update, MAU, request received from the UE and initiate a handshake procedure including exchange of capabilities with the previous MCN, send a context acknowledge message to the previous MCN when it has accepted the MAU request and updated the established bearers towards the PGW (12).

The problem is finally solved by means of a previous Mobility Control Node, MCN, being adapted to remove at least one Packet Data Protocol, PDP, context existing in the GGSN as a result of a context acknowledge message received from said present MCN.

The main advantage with the invention is that an UE/MS with PDP contexts to both GGSN and PGW may move from a Gn-SGSN (previous MCN) to a MME (present MCN) while keeping its Packet Data Network connections towards PGW without the risk of having hanging PDP contexts in the GGSN.

BRIEF DESCRIPTION OF THE DRAWINGS

The invention will be described in greater detail in the following, with reference to the examples that are shown in the attached drawings, in which.

DETAILED DESCRIPTION

The embodiments of the invention with further developments described in the following are to be regarded only as examples and are in no way to limit the scope of the protection provided by the patent claims.

The present invention relates to a method for context handling when a user equipment, with established bearers (also includes PDP Contexts) towards a GGSN (Gateway GGSN Support Node) and a PGW (Packet Data Network Gateway). The PGW has Gn/Gp interface and thus acts as a GGSN over that interface. The user equipment, moves from a previous access network to a present access network. The previous access network communicates with the gateways via a previous mobility control node and the present access network communicates with the PGW via a present mobility control node. It also relates to a previous mobility control node and a present control node adapted for the same purpose.

Even though the detailed description describes the method performed by these functions, the person skilled in the art realizes that these functions, which are adapted to perform these method steps, are also disclosed in the description.

Figure 1:
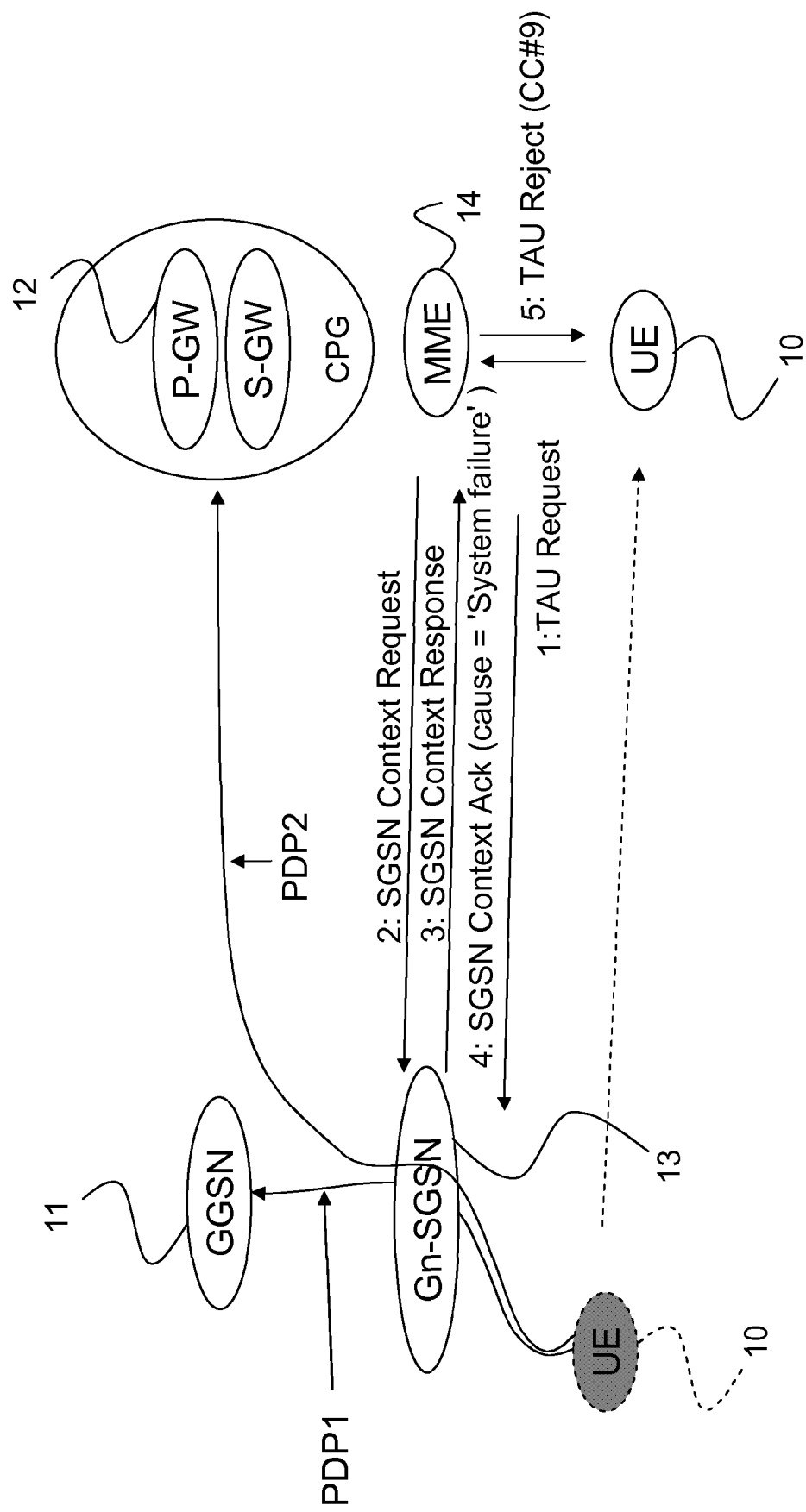
FIG. 1 illustrates schematically a network signaling flow procedure according to a known signaling flow procedure.

FIG. 1 show an architecture and a known signaling flow procedure for a Mobility Access Update (MAU) request when an UE 10 moves from a previous Access Network (AN) to a present AN. The MAU will in the following be exemplified by a Target Area Update (TAU). Information about the signaling flow procedure and the architecture can be found in 3GPP 23.401, chapter D.3.6 "Gn-SGSN to MME Tracking Area Update". The architecture and procedure will therefore not be described in detail in this document.

The UE 10 has bearers/PDP Contexts established towards the GGSN 11 and the PGW 12. The previous AN communicates with the GGSN 11 and the PGW 12 via a previous MCN (Mobility Control Node) 13, which in the following will be exemplified by a Gn-SGSN (Serving Gateway Support Node). Gn-SGSN is an SGSN not supporting S4 interface but only Gn/Gp interface. The present AN communicates with the PGW via a present MCN 14, which in the following will be exemplified by a MME (Mobility Management Entity). The present AN will in the following be exemplified by an Evolved Universal Terrestrial Radio Access Network, E-UTRAN and the previous AN, which will in the following be exemplified by a GSM EDGE Radio Access Network, GERAN or an UMTS Terrestrial Radio Access Network, UTRAN.

In EPC (Evolved Packet Core) the MME has no interface towards the GGSNs 11. Since the MME has no interface towards the GGSN, there is a problem when the MS/UE (Mobile Station/User Equipment) moves to EPC. The PDP (Packet Data Protocol) contexts in the GGSN can't be handled by the MME and there exist no possible way to remove them. This results in "hanging" PDP contexts.

Figure 4:
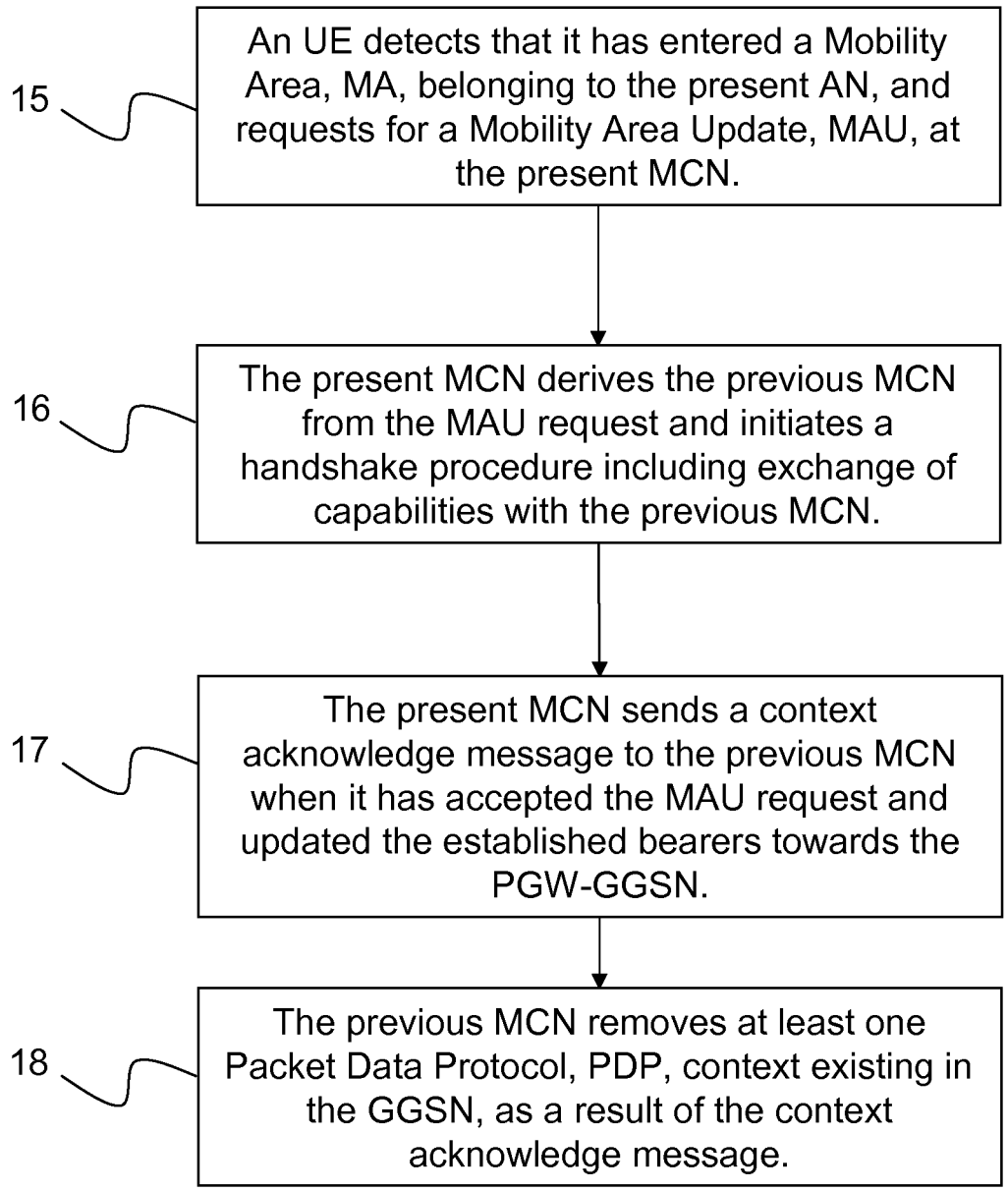
FIG. 4 illustrates a flow scheme for the method according to the present invention.

The present invention provides a solution to this problem. With this solution, there is no need to reject the whole TAU (Target Area Update) procedure when moving to EPC if the MS/UE simultaneously has PDP contexts activated towards both GGSN 11 and PGW 12. The present invention comprises four steps. Step 1 is a known step while steps 2, 3 and 4 are new. These steps are shown in FIG. 4:

1. The UE 10 detects 15 that it has entered a TA belonging to the present AN, and request for a TAU at the present MCN 14.
2. The present MCN 14 derives 16 the previous MCN 13 from the TAU request and initiates a handshake procedure including exchange of capabilities with the previous MCN.
3. The present MCN sends 17 a context acknowledge message to the previous MCN when it has accepted the TAU request and updated the established bearers towards the PGW 12.
4. The previous MCN removes 18 at least one Packet Data Protocol, PDP, context existing in the GGSN, as a result of the context acknowledge message.

In the following, two examples of signaling flow procedures shown in FIGS. 2 and 3 will be described. Some steps in the signaling procedure corresponds to the steps described in 3GPP 23.401, chapter D.3.6 "Gn-SGSN to MME Tracking Area Update". These will not be described further in this document. The steps that are new in the presented invention will however be described in the following.

PDP 1 in the figures is an established PDP context towards GGSN 11 while PDP 2 is an established context towards PGW 12. The handshake procedures comprises a SGSN context request message (step 2), a response message (step 3) and the context acknowledge message (step 5), see FIGS. 2 and 3.

Figure 2:
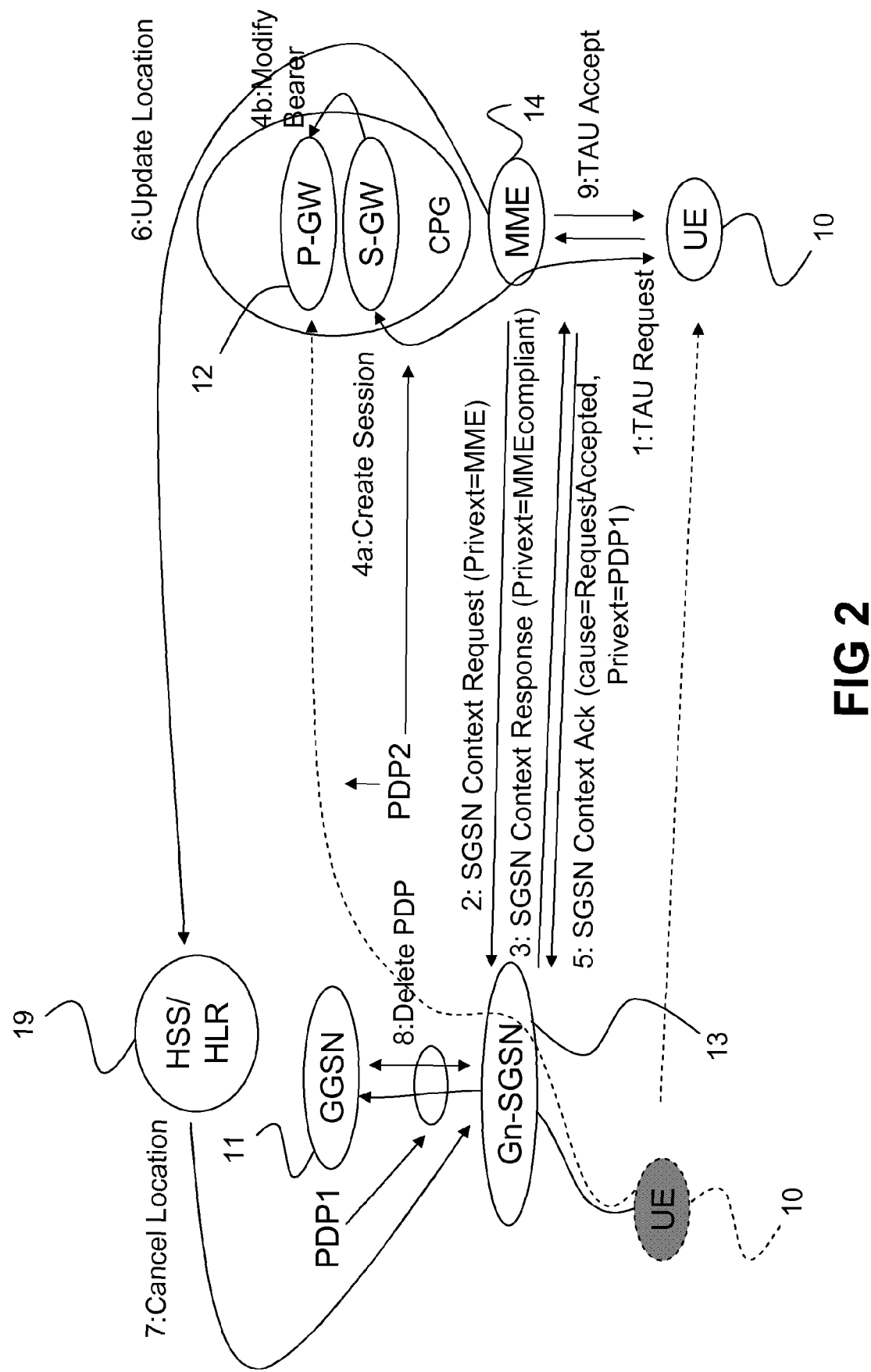
FIG. 2 illustrates a first example of a signaling flow procedure according to the present invention.
Figure 3:
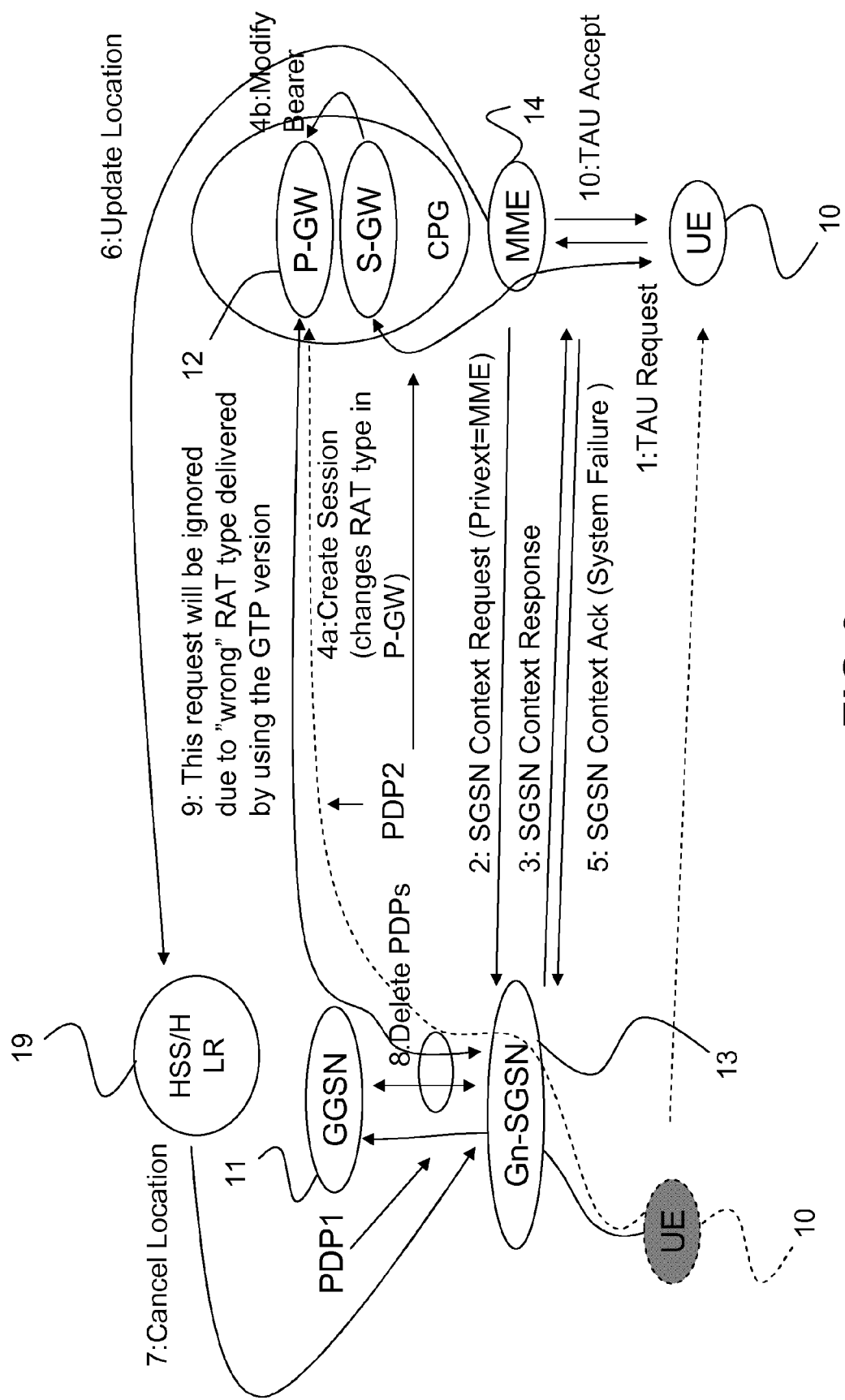
FIG. 3 illustrates a second example of a signaling flow procedure according to the present invention.

Common for the two examples according to FIGS. 2 and 3 is that the handshake procedure includes the exchange of capabilities. The capabilities comprise the capability of the MME 14 to send information to the Gn-SGSN 13 about the PDP Contexts that should be removed. The capabilities also comprise the capability of the Gn-SGSN 13 to handle the information sent from the MME 14 about the PDP Contexts that should be removed.

The exchange of capabilities comprises a step at which the MME 14 in a request (step 2) to the Gn-SGSN 13 includes its capability to send PDP Context information. The exchange also comprises a step (step 3) at which the response from the Gn-SGSN to the MME indicates its capability to handle the PDP Context information.

The capability information is included in a private extension (privext=MME) in the context request. The capability of the Gn-SGSN is thereby tested using the private extensions (privext) IE (Information Element) in the request. If the context response (step 3) includes information (privext=MMEcompliant) that the Gn-SGSN has such a capability, the handshake procedure result is positive and the example according to FIG. 2 will be executed. If the Gn-SGSN is not compatible, the Gn-SGSN has no such information. The handshake procedure result is then negative and the example according to FIG. 3 will be executed. The example according to FIG. 3 is used provided that MME 11 via configuration knows that PGW 12 is compatible.

Common for the two examples is also that the Gn-SGSN 13 removes at least one PDP context when it receives a context cancelling message from a HLR 19 (Home Location Register). The context cancelling message will in the following be exemplified by a cancel location message (step 7). The HLR sends the message during an update location procedure (step 6) initiated by the MME 14. Common is moreover that the Gn-SGSN 13 removes the context by sending a delete context request message (step 8) to the GGSN 11. Common is finally that the MME sends a TAU accept message to the UE (step 9).

FIG. 2 illustrates a signaling flow procedure according to a first example in the present invention. In this example, the handshake procedure result is positive and the MME 14 sends a positive context acknowledge message (step 5) to the Gn-SGSN 13. The message comprises information regarding which at least one PDP context that should be removed in the GGSN 11.

The MME 14 accepts the TAU request 1 and allows all possible bearers/PDP Contexts to stay alive. It informs in the acknowledge message (step 5) the Gn-SGSN 13 about which PDP contexts that should be removed when a cancel location message 7 is received from the HLR 19 (Home Location Register) or when a T3 tunnel timer expires. The HLR generates said message when the MME updates (step 6) its location in the HLR. Basically, the context acknowledge message (step 5) is expanded with a new IE (Information Element) containing the "failed" PDP contexts that should be removed. MME 14 re-establishes the payload path (see step 4a and 4b) for the PDP Contexts/Bearers in the PGW 12.

FIG. 3 illustrates a signaling flow procedure according to a second example in the present invention. In this example the handshake procedure result is negative. The MME 14 sends a negative context acknowledge message (step 5) to the Gn-SGSN 13. The message comprises instructions to keep all PDP contexts in the GGSN. The delete context request message (step 8) is also sent by the Gn-SGSN to the PGW 12. The PGW ignores said message or rejects it by confirmation to the Gn-SGSN 13, since it is received on a wrong protocol version.

The MME 14 accepts the TAU request (step 1) and allows all possible bearers/PDP Contexts to stay alive. It sends a negative context acknowledge message (step 5) to the Gn-SGSN 13, forcing the Gn-SGSN to remove all PDP contexts when a cancel location message (step 7) is received from HLR 19. The PGW 12 shall stop to listen to GTPv1 message when a successful Modify Bearer Request/Response procedure has been executed between S-GW and PGW 11.

3GPP CR is needed on 3 GPP 29.274 to prevent actions in the P-GW 12 when a GTPv1 message is received after a successful Modify Bearer Request/Response procedure has been executed. The Modify procedure (step 4b) between the S-GW and P-GW is triggered by the "Create Session Request" message in step 4a. The Delete PDP Context request message (step 8) is either ignored by the P-GW 12 or answered but not acted upon in the P-GW in step 9.

A combination between a negative response (where the Gn-SGSN does not have capabilities) and the private extension IE indicating the "failed" PDP is also possible. This to ensure even more backward compatibility, see step 5.

The invention is not to be regarded as being limited to the examples described above. A number of additional variants and modifications are possible within the scope of the subsequent patent claims.

The invention claimed is:

1. A method for context handling when a user equipment (UE) with established bearers towards a Gateway GPRS Support Node (GGSN) and a Packet Data Network GGSN(PGW) moves from a previous Access Network (AN) to a present AN, the previous AN communicating with the GGSN and the PGW via a previous Mobility Control Node (MCN) and the present AN communicating with the PGW via a present MCN, the method comprising the steps of:

the present MCN deriving the previous MCN from a Mobility Area Update (MAU) request from the UE and performing a handshake procedure including an exchange of capabilities with the previous MCN, the handshaking procedure including (i) the present MCN sending to the previous MCN a first message indicating that the present MCN is capable of sending information about a Packet Data Protocol (PDP) context existing in the GGSN that should be deleted by the previous MCN, and (ii) the present MCN receiving a second message transmitted by the previous MCN in response to the first message, the second message indicating whether the previous MCN is capable of handling the information about the PDP context; and as a result of receiving the second message, the present MCN sending a context acknowledge message to the previous MCN after the present MCN has accepted the MAU request and updated the established bearers towards the PGW, wherein a content of the context acknowledge message is based on information provided by the second message.

2. The method according to claim 1, wherein the previous MCN removes the PDP context when it receives a context cancelling message from a Home Location Register (HLR), the HLR sending the message during an update location procedure initiated by the present MCN.

3. The method according to claim 1, wherein the previous MCN removes the context by sending a delete context request message to the GGSN.

4. The method according to claim 3, wherein the delete context request message is also sent by the previous MCN to the PGW, the PGW ignoring the message or rejecting by confirmation to the previous MCN.

5. The method according to claim 1, wherein in response to determining that the handshake procedure result indicates that (i) the present MCN is capable of sending information about the PDP context and (ii) the previous MCN is capable of handling the information about the PDP context, the context acknowledge message transmitted by the present MCN to the previous MCN, is a positive context acknowledge message that comprises the identification of the PDP context that should be deleted by the previous MCN in the GGSN.

6. The method according to claim 5, wherein the previous MCN removes the PDP context when, after receiving the positive context acknowledge message, the previous MCN receives a context cancelling message from a Home Location Register (HLR), the HLR sending the message during an update location procedure initiated by the present MCN.

7. The method according to claim 1, wherein in response to determining that the handshake procedure result indicates that (i) the present MCN is not capable of sending the information about the at least one PDP context or (ii) the previous MCN is not capable of handling the information about the at least one PDP context, the context acknowledge message transmitted by the present MCN to the previous MCN is a negative context acknowledge message that comprises instructions to keep all PDP contexts in the GGSN.

8. The method according to claim 1, wherein the previous MCN consists in a Gn Serving GPRS Support Node (Gn-SGSN).

9. The method according to claim 1, wherein the present MCN consists in a Mobility Management Entity (MME).

10. The method according to claim 1, wherein the first message includes an information element that indicates whether the present MCN is capable of sending information about the PDP context existing in the GGSN that should be removed.

11. The method according to claim 1, wherein the second message includes an information element indicating whether the previous MCN is capable of handling the information about the PDP context existing in the GGSN that should be removed.

12. A method for context handling when a user equipment, UE, with established bearers towards a Gateway GPRS Support GGSN, and a Packet Data Network GGSN(PGW) moves from a previous Access Network (AN) to a present AN, the previous AN communicating with the GGSN and the PGW via a previous Mobility Control Node (MCN) and the present AN communicating with the (PGW) via a present MCN, the method comprising the steps of:

the present MCN deriving the previous MCN from a Mobility Area Update (MAU) request received from the UE and performing a handshake procedure including an exchange of capabilities with the previous MCN, the handshaking procedure including (i) the present MCN sending to the previous MCN a first message indicating that the present MCN is capable of sending information about a Packet Data Protocol (PDP) context existing in the GGSN, and (ii) the present MCN receiving a second message transmitted by the previous MCN in response to the first message, the second message indicating whether the previous MCN is capable of handling the information about the PDP context; and as a result of receiving the second message, the present MCN sending a context acknowledge message to the previous MCN after the present MCN has accepted the MAU request and updated the established bearers towards the PGW, wherein a content of the context acknowledge message is based on information provided by the second message.

13. The method of claim 12, wherein the previous MCN removes the PDP context existing in the GGSN as a result of the context acknowledge message received from the present MCN.

14. An apparatus comprising:

a present Mobility Control Node (MCN) being configured for context handling when a user equipment (UE) with established bearers towards a Gateway GPRS Support Node (GGSN) and a Packet Data Network GGSN (PGW) moves from a previous Access Network (AN) to a present AN, the previous AN communicating with the with the GGSN and the PGW via a previous MCN and the present AN communicating with the PGW via the present MCN, wherein the present MCN is configured to derive the previous MCN from a Mobility Area Update (MAU) request received from the UE and perform a handshake procedure including an exchange of capabilities with the previous MCN, the handshaking procedure including (i) the present MCN sending to the previous MCN a first message indicating that the present MCN is capable of sending information about a Packet Data Protocol (PDP) context existing in the GGSN that should be deleted by the previous MCN, and (ii) the present MCN receiving a second message transmitted by the previous MCN in response to the first message, the second message indicating whether the previous MCN is capable of handling the information about the PDP context, and the present MCN is further configured to, as a result of receiving the second message, send a context acknowledge message to the previous MCN after the present MCN has accepted the MAU request and updated the established bearers towards the PGW, wherein a content of the context acknowledge message is based on information provided by the second message.

15. A system comprising:

a first Mobility Control Node (MCN) being configured for context handling when a user equipment (UE) with established bearers towards a Gateway GPRS Support Node (GGSN) and a Packet Data Network GGSN (PGW) moves from a previous Access Network (AN) to a first AN, the previous AN communicating with the GGSN and the PGW via a previous MCN and the first AN communicating with the PGW via the first MCN, wherein the first MCN is configured to derive the previous MCN from a Mobility Area Update (MAU) request received from the UE and perform a handshake procedure including an exchange of capabilities with the previous MCN, the handshaking procedure including (i) the first MCN sending to the previous MCN a first message indicating that the first MCN is capable of sending information about a Packet Data Protocol (PDP) context existing in the GGSN that should be deleted by the previous MCN, and (ii) the first MCN receiving a second message transmitted by the previous MCN in response to the first message, the second message indicating whether the previous MCN is capable of handling the information about the PDP context, and the first MCN is further configured to send, as a result of receiving the second message, a context acknowledge message to the previous MCN after the first MCN has accepted the MAU request and updated the established bearers towards the PGW, wherein a content of the context acknowledge message is based on information provided by the second message.

16. The method according to claim 15, wherein the previous MCN removes the PDP context when, after receiving the context acknowledge message and the context acknowledge message includes and identification of the PDP context, the previous MCN receives a context cancelling message from a Home Location Register (HLR), the HLR sending the message during an update location procedure initiated by the present MCN.

* * * * *